United States Patent Office 3,401,181
Patented Sept. 10, 1968

3,401,181
17α - ARALIPHATYLESTRA - 1,3,5(10) - TRIENE-3,11β,17β-TRIOLS AND ESTERS THEREOF
Paul D. Klimstra, Northbrook, Ill., assignor to G. D. Searle & Co., Chicago, Ill., a corporation of Delaware
No Drawing. Filed June 21, 1967, Ser. No. 647,629
9 Claims. (Cl. 260—397.5)

ABSTRACT OF THE DISCLOSURE

17α-araliphatylestra-1,3,5(10)-triene-3,11β, 17β-triols and esters thereof useful as pharmacological agents, as evidenced by their estrogenic, anti-fertility and hypocholesterolemic properties. These novel compounds are prepared by addition of the appropriate organometallic reagent to the corresponding 17-keto starting materials or, alternatively, in the case of the 17α-phenylvinyl or 17α-phenylethyl derivatives, by partial or complete reduction of the acetylenic linkage of the instant 17-phenylethynyl substances. Acylation with a suitable alkanoic acid anhydride or halide provides the corresponding esters.

---

The present invention is concerned with novel steroidal derivatives characterized by an araliphatyl substituent at the 17-position and by oxygenated functions at the 3,11, and 17-positions and, more particularly, with 17α-araliphatylestra-1,3,5(10)-triene-3,11β, 17β-triols and esters thereof represented by the following structural formula

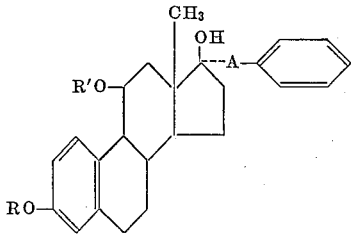

wherein A is selected from the group consisting of ethynylene, vinylene, and lower alkylene radicals and R and R' are members of the class consisting of hydrogen and lower alkanoyl radicals.

Representative lower alkylene radicals embraced by the A term are ethylene, trimethylene, tetramethylene, pentamethylene and the corresponding branched-chain groups.

The term lower alkanoyl is exemplified by formyl, acetyl, propionyl, butyryl, valeryl, caproyl, heptanoyl and the branched-chain radicals isomeric therewith.

The compounds of this invention are conveniently manufactured by processes which utilize as the starting material 3,11β-dihydroxyestra-1,3,5(10)-trien-17-one. Reaction of that substance with a suitable organometallic reagent affords the corresponding instant 17α-araliphatyl-17β-ols. A specific example is the reaction of that starting material with sodium phenylacetylide to afford 17α-phenylethynylestra-1,3,5(10)-triene-3,11β, 17β-triol.

An alternate method for preparation of the instant 17α-phenylvinyl or 17α-phenylethyl compound involves, respectively, partial or complete reduction of the acetylenic linkage of the corresponding 17α-phenylethynyl substances. An example of partial reduction is the hydrogenation of the aforementioned 17α-phenylethynylestra-1,3,5(10)-triene-3,11β, 17β-triol in pyridine in the presence of 5% palladium-on-carbon catalyst to yield 17α-phenylvinylestra-1,3,5(10)-triene-3,11β,17β-triol. Complete saturation of the acetylenic linkage to afford the 17α-phenylethyl derivative is effected by hydrogenation in a neutral solvent such as ethanol.

Acylation of the instant triols with a lower alkanoic acid anhydride or halide, preferably in the presence of a suitable acid acceptor such as pyridine or triethylamine, at or near room temperature, affords the corresponding 3,11-bis-(lower alkanoates). When a limited quantity of a lower alkanoyl halide and brief reaction time are utilized, the 3-mono-(lower alkanoates) are produced. Specific illustrations are the reaction of 17α-benzylestra-1,3,5(10)-triene-3,11β,17β-triol with acetic anhydride and pyridine for about 20 hours to yield the 3,11-diacetate or the reaction of that triol with a limited quantity of acetyl chloride in pyridine for about 3 hours to produce the 3-monoacetate.

The novel compounds of this invention display valuable pharmacological properties. They possess, for example, estrogenic, anti-fertility and hypocholesterolemic properties. These substances can be administered in any of a number of conventional pharmaceutical forms and also by conventional routes. For oral administration suitable solid forms are pills, powders, capsules, tablets or the like and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the estrogenic response produced in immature female mice injected subcutaneously with corn oil solutions of 17α-benzylestra-1,3,5(10)-triene-3,11β-17β-triol 3,11-diacetate over a period of 3 days at total doses varying between 0.0001 and 1.0 mg. per mouse. As compared to the standard, i.e. subcutaneously administered estrone, this compound possesses a potency of 120%.

The invention will appear more fully from the examples which follow. These examples are given by way of illustration only, however, and are not to be construed as limiting the invention either in spirit or in scope as many modifications both in materials and methods will be apparent from this disclosure to those skilled in the art. In these examples temperatures are given in degrees centigrade (° C.) and materials in parts by weight unless otherwise noted.

EXAMPLE 1

To a mixture of 5.4 parts of magnesium turnings with 70 parts of ether, in a nitrogen atmosphere, is added, over a period of 45 minutes, a solution of 25.6 parts of benzyl chloride in 17.5 parts of ether. That mixture is stirred at the reflux temperature for about 45 minutes longer, at the end of which time there is added a solution of 10 parts of 3,11β-dihydroxyestra-1,3,5(10)-trien-17-one in 238 parts of hot tetrahydrofuran. After the reaction mixture has been refluxed for about 16 hours, a solution of 10 parts of ammonium chloride in 55 parts of water is added. The organic layer is separated by decantation and the aqueous residue is saturated with sodium sulfate, then extracted with tetrahydrofuran. The combined organic solutions are concentrated to dryness under reduced pressure and the remaining solid is washed with hot ethyl acetate, then collected by filtration to afford 17α-benzylestra-1,3,5(10)-triene-3,11β,17β-triol, which melts at about 234–236°. It exhibits an optical rotation of +112° in ethanol and is represented by the following structural formula

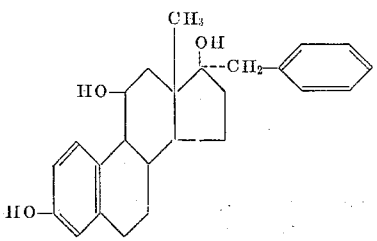

EXAMPLE 2

To a mixture of 2.2 parts of metallic sodium with 90 parts of tetrahydrofuran is added dropwise with warming over a period of about 1 hour, 14 parts of phenylacetylene. At the end of 1 hour of reflux time a solution of 7 parts of 3,11β-dihydroxyestra-1,3,5(10)-trien-17-one in 144 parts of tetrahydrofuran is added over a period of about 45 minutes. The resulting reaction mixture is heated at the reflux temperature for about 24 hours, then is diluted with approximately 6 parts of water. The mixure is neutralized by pouring into a mixture of ice and water containing excess hydrochloric acid. That aqueous mixture is extracted with ether and the ether layer is separated, washed successively with water and dilute aqueous sodium bicarbonate, then dried over anhydrous sodium sulfate containing decolorizing carbon. The solvent is removed by distillation to afford an oily residue, which is triturated with hexane, thus affording the crude semi-solid product. Purification by recrystallization from acetone-hexane produces needle-like crystals of solvated 17α-phenylethynylestra-1,3,5(10)-triene-3,11β,17β-triol, melting at about 130–132°. It is represented by the following structural formula

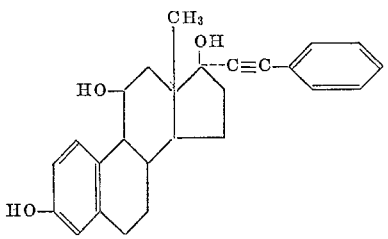

EXAMPLE 3

A mixture containing 2.5 parts of 17α-benzylestra-1,3,5(10)-triene-3,11β,17β-triol, 12 parts of acetic anhydride and 23 parts of pyridine is allowed to stand at room temperature for about 20 hours, then is poured into water and the resulting aqueous mixture is extracted with benzene. The organic layer is washed with water then chromatographed on a silica gel column and eluted with 15% ethyl acetate in benzene to afford the crude product, which is purified by recrystallization from aqueous methanol, thus yielding 17α-benzylestra-1,3,5(10)-triene-3,11β,17β-triol 3,11-diacetate, melting at about 119–121°. This compound is represented by the following structural formula

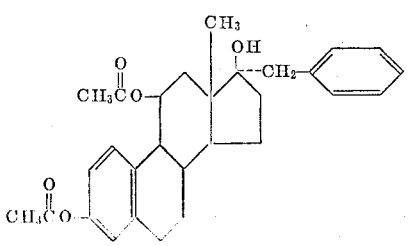

EXAMPLE 4

To a solution of 1 part of 17α-phenylethynylestra-1,3,5(10)-triene-3,11β,17β-triol in 40 parts of pyridine is added 0.1 part of 5% palladium-on-carbon catalyst and that reaction mixture is shaken with hydrogen at atmospheric pressure and room temperature for about 45 minutes. During that time 1 molecular equivalent of hydrogen is absorbed. The catalyst is removed by filtration and the filtrate is diluted with a large quantity of water, then is extracted with ether. The ether layer is separated, washed successively with hydrochloric acid and dilute aqueous sodium bicarbonate, then dried over anhydrous potassium carbonate containing decolorizing carbon. Removal of the solvent by distillation under reduced pressure affords an oily residue which solidifies upon standing to afford the crude product. Purification is effected by recystallization from aqueous methanol, thus yielding solvated 17α-phenylvinylestra-1,3,5(10)-triene-3,11β,17β-triol, which melts at about 111–114°. It is represented by the following structural formula

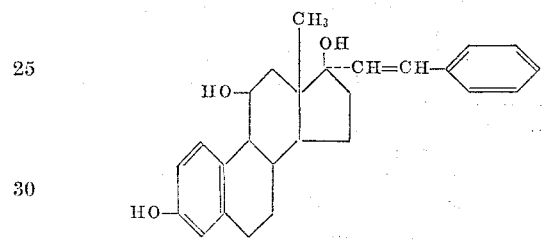

EXAMPLE 5

A mixture containing 1 part of 17α-benzylestra-1,3,5-(10)-triene-3,11β,17β-triol, 1 part of acetyl chloride and 20 parts of pyridine is allowed to stand at room temperature for about 3 hours, then is diluted with water. The aqueous mixture is extracted with benzene and the benzene layer is separated, washed successively with water and dilute aqueous sodium bicarbonate, dried over anhydrous potassium carbonate, then concentrated to dryness under reduced pressure. Recrystallization of the resulting residue from aqueous methanol affords 17α-benzylestra-1,3,5(10)-triene-3,11β,17β-triol-3-acetate.

EXAMPLE 6

To a solution of 1 part of 17α-phenylethynylestra-1,3,5 (10)-triene-3,11β,17β-triol in 40 parts of ethanol is added 0.1 part 5% palladium-on-carbon catalyst, and the resulting reaction mixture is shaken with hydrogen at atmosspheric pressure and room temperature until 2 molecular equivalents of hydrogen have been absorbed. Removal of the catalyst by filtration affords a solution which is poured into a mixture of ice and water. The resulting mixture is extracted with chloroform and the organic layer is separated, washed with water, dried over anhydrous potassium carbonate and concentrated to dryness by distillation under reduced pressure. Recrystallization of the resulting crude product from acetone-hexane affords 17α-phenylethylestra-1,3,5(10)-triene-3,11β, 17β-triol.

EXAMPLE 7

When an equivalent quantity of propionic anhydride is substituted for acetic anhydride in the procedure of Example 3, there is produced 17α-benzylestra-1,3,5(10)-triene-3,11β,17β-triol 3,11-dipropionate.

EXAMPLE 8

By substituting an equivalent quantity of propionic anhydride and otherwise proceeding according to the processes of Example 5, there is produced 17α-benzylestra-1,3,5(10)-triene-3,11β,17β-triol 3-propionate.

What is claimed is:
1. A compound of the formula

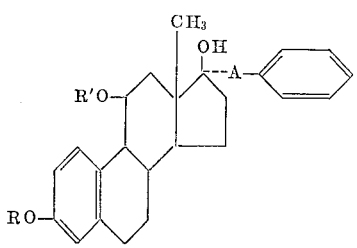

wherein A is selected from the group consisting of ethynylene, vinylene and lower alkylene radicals and R and R' are members of the class consisting of hydrogen and lower alkanoyl radicals.

2. As in claim 1, a compound of the formula

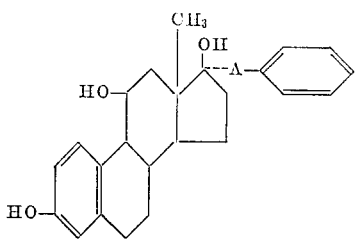

wherein A is selected from the group consisting of ethynylene, vinylene and lower alkylene radicals.

3. As in claim 1, a compound of the formula

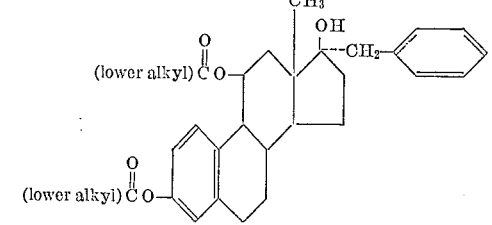

4. As in claim 1, a compound of the formula

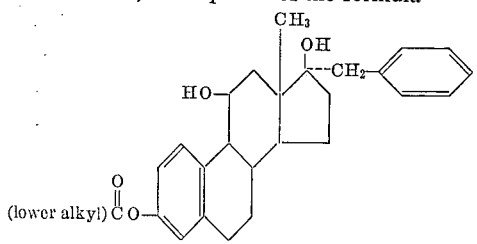

5. As in claim 1, the compound which is 17α-benzylestra-1,3,5(10)-triene-3,11β,17β-triol.
6. As in claim 1, the compound which is 17α-phenylethynylestra-1,3,5(10)-triene-3,11β,17β-triol.
7. As in claim 1, the compound which is 17α-benzylestra-1,3,5(10)-triene-3,11β,17β-triol 3,11-diacetate.
8. As in claim 1, the compound which is 17α-benzylestra-1,3,5(10)-triene-3,11β,17β-triol 3-acetate.
9. As in claim 1, the compound which is 17α-phenylvinylestra-1,3,5(10)-triene-3,11β,17β-triol.

References Cited
UNITED STATES PATENTS
3,193,564  7/1965  Counsell _____ 260—397.5
3,313,702  4/1967  Joly _____ 167—74

LEWIS GOTTS, *Primary Examiner.*
E. G. LOVE, *Assistant Examiner.*